May 1, 1962     A. C. PITCHFORD     3,032,437

METHOD OF RESTRICTING PROPELLANT GROINS

Filed Sept. 17, 1958     2 Sheets-Sheet 1

INVENTOR.
A.C. PITCHFORD

BY *Hudson & Young*

ATTORNEYS

May 1, 1962  A. C. PITCHFORD  3,032,437
METHOD OF RESTRICTING PROPELLANT GROINS
Filed Sept. 17, 1958  2 Sheets-Sheet 2

INVENTOR.
A.C. PITCHFORD
BY Hudson E. Young
ATTORNEYS

Patented May 1, 1962

1

3,032,437
METHOD OF RESTRICTING PROPELLANT GRAINS
Armin C. Pitchford, Bartlesville, Okla., assignor to Phillips Petroleum Company, a corporation of Delaware
Filed Sept. 17, 1958, Ser. No. 761,653
6 Claims. (Cl. 117—72)

This invention relates to restricting solid propellant. In one aspect, it relates to a method of restricting certain surfaces of solid propellant, such as that of a composite type comprising an oxidant and a binder or fuel, in such a manner as to effectively limit the ignition of such propellant to those exposed or unrestricted surfaces. In another aspect, it relates to a solid propellant charge having certain surfaces thereof restricted in a novel manner. In another aspect, it relates to novel restricting materials for solid propellants. In another aspect, it relates to rocket motors, gas generators, and the like, loaded with a charge of solid propellant having certain surfaces thereof restricted in a novel manner.

Solid propellant charges, such as those used in rocket motors, are often fabricated with some of their surfaces exposed so as to serve as surfaces which are ignited during operation. In order to control the burning or consumption of the propellant material, other surfaces thereof are covered with relatively non-combustible materials, generally referred to in the art as burning restricting materials, to prevent ignition of these other surfaces. Many of the restricting materials and method used heretofore have been found wanting in fulfilling certain desirable requirements. In many cases it has been found that the bond between restrictor and the propellant material was not strong or effective, especially during aging of the propellant at elevated temperatures for extended periods. Failure of the bond between the restrictor and the propellant material results in the undesirable exposure of additional burning surface, the ignition of this undesirable burning surface leading to uncontrolled burning of the propellant material with consequent generation of excessive pressures, resulting in poor performance or explosion of the rocket motor.

Accordingly, an object of this invention is to restrict solid propellant. Another object is to improve the control of the burning or consumption of solid propellant. Another object is to provide a method of restricting certain surfaces of a solid propellant charge. Another object is to provide a novel restricting material for solid propellants, said restricting material being characterized by its ability to remain strongly bonded to the propellant notwithstanding the severe conditions arising during the operation of the rocket motor or storage of the propellant at elevated temperatures for an extended period of time. Another object is to provide a solid propellant charge, such as that comprising a major amount of an oxidant and a minor amount of a rubbery binder or fuel, said charge having certain surfaces thereof restricted in a novel manner. Another object is to provide a rocket motor loaded with a charge of solid propellant, the latter having certain surfaces thereof exposed and other surfaces thereof restricted in a novel manner. Other objects and advantages of this invention will become apparent, to those skilled in the art, from the following discussion, appended claims, and drawing in which:

I have discovered that an effective strong bond between solid propellant and rubbery restrictor material can be obtained by insuring the presence of a water-soluble chromium compound such as ammonium dichromate, at the juncture of or interface between the two materials. I accomplish this by either of a number of different ways: first applying a thin coating of a solution of a water-soluble chromium compound to the surface of the propellant desired to be restricted, and then bonding the rubbery restrictor thereto with an adhesive; or employing a rubber base adhesive composition in which there is present a sufficient amount of a water-soluble chromium compound, and bonding the restrictor with a thin layer of this adhesive to the propellant surface desired to be restricted; or using a novel rubbery restrictor material having incorporated in the composition thereof a water-soluble chromium compound, this restrictor being bonded with an adhesive to the propellant surface desired to be restricted.

The solid propellant charge desired to be restricted in accordance to this invention can have any type of geometry, and is especially applicable to those charges having oppositely-disposed exposed burning surfaces. For example, the geometry of the charge can be such that it will be of the end-burning type, the internal-burning type, the external-burning type, and the internal-external burning type, the ignition of such charges being limited to those surfaces which are exposed or unrestricted. For purposes of illustrating the application of this invention, reference will now be made to the accompanying drawing, bearing in mind that the charges illustrated therein can be restricted according to any of the foregoing alternative procedures.

Figure 1:
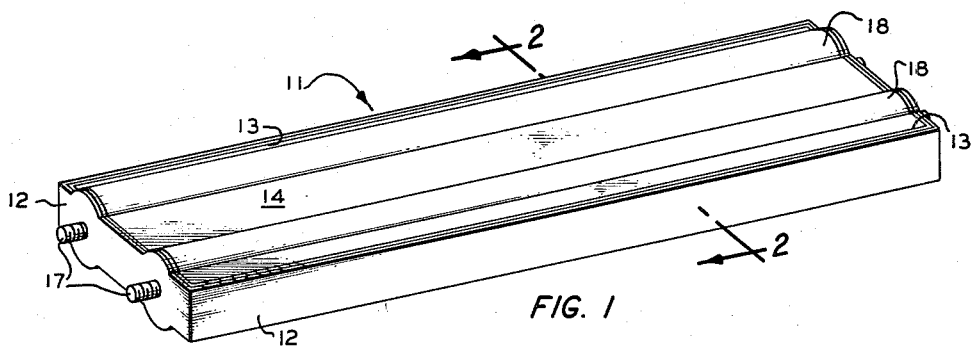
FIGURE 1 is an isometric view of one type of grain of solid propellant having surfaces thereof restricted in accordance with this invention.
Figure 2:
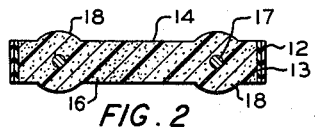
FIGURE 2 is an elevational cross-sectional view of FIGURE 1 taken along the plane indicated.

Referring to the drawing, in which like parts have been designated with like reference numerals, and initially to FIGURES 1 and 2, a slab-type grain of solid propellant generally designated 11 is shown, this grain because of its two oppositely exposed burning surfaces can be called a double-web grain of propellant. Grain 11 has a generally rectangular parallelepiped configuration with its ends and sides covered with burning restricting material 12, fabricated from a rubbery copolymer of butadiene and methylvinylpyridine, for example, that is adhesively bonded with a thin layer of adhesive 13 to the propellant material, the effectiveness or strength of the bond being insured by the presence of a water-soluble chromium compound at the interface between the propellant surface and restricting material. The oppositely-disposed upper and lower surfaces 14 and 16, respectively, are exposed or unrestricted and serve as initial burning surfaces of the grain. Grain 11 is preferably provided with one or more longitudinally aligned support rods 17, preferably made of metal, which pass through the propellant material of the grain and protrude from the ends thereof, the protruding ends of the rod preferably being threaded. The upper and lower exposed surfaces 14, 16 are preferably provided with two ribs or protuberant portions 18 which are also exposed and form portions of the respective upper and lower surfaces of the grain. Ribs 18 are longitudinally and vertically aligned with support rods 17 and the surface area of the ribs is equal to or slightly greater than the surface area defining the perforations provided in the grain for the internal support rods.

Grain 11 is illustrative of the types of grains which can be restricted according to this invention. When such grains are loaded in a rocket motor and the latter is fired, the exposed burning surfaces 14, 16 are ignited and the propellant material of grain is consumed on both sides thereof in relatively parallel layers, as is well known in the art. The restricting material 12 is relatively non-combustible or has a very low burning rate compared to that of the propellant material making up the grain. The restricting material is capable of being securely bonded to the desired surfaces of the grain and is flame and pressure resistant. Moreover, despite the severe conditions encountered during storage or operation of the solid propellant rocket motor, the restricting material will retain its desired properties for relatively long durations and is fairly easy to apply in an inexpensive manner.

Figure 3:
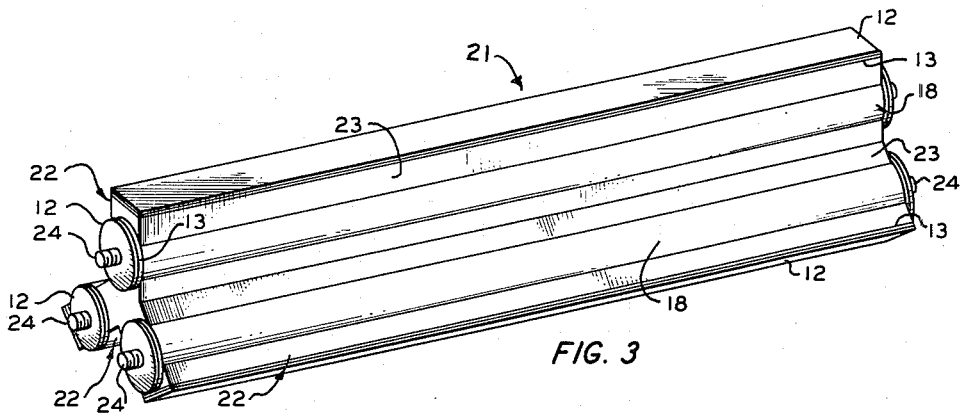
FIGURE 3 is an isometric view of another type of grain of solid propellant restricted according to this invention.

Referring now to FIGURE 3, another type of rocket grain of solid propellant generally designated 21 is shown and represents another type of grain which can be restricted according to this invention. Grain 21 has a triform shape and has three radiating arms 22, each arm being preferentially spaced about 120° from adjacent arms. The extremities of each arm or the tops thereof are covered with burning restricting material 12 which is bonded by adhesive 13 to the propellant material, while the sides 23 of each arm are exposed to serve as burning surfaces. Grain 21 can be provided with one or more support rods 24 passing through each of the arms 22, the protruding ends of each of the support rods also being provided with threads as shown. The ends of each of the arms 22 are bonded with adhesive 13 to disc-like pieces of restricting material 12. Those portions of the ends of grain 21 which are not covered with restricting material are also exposed to serve as burning surfaces. The sides 23 of each arm 22 are also provided with longitudinally extending ribs 18 so as to compensate for the perforations of each arm in which support rods 24 are positioned. Grain 21 is also of the external-burning type, each arm having two oppositely disposed burning surfaces which are ignited upon firing of the rocket motor, the propellant material of each arm being consumed in relatively parallel layers.

Figure 4:
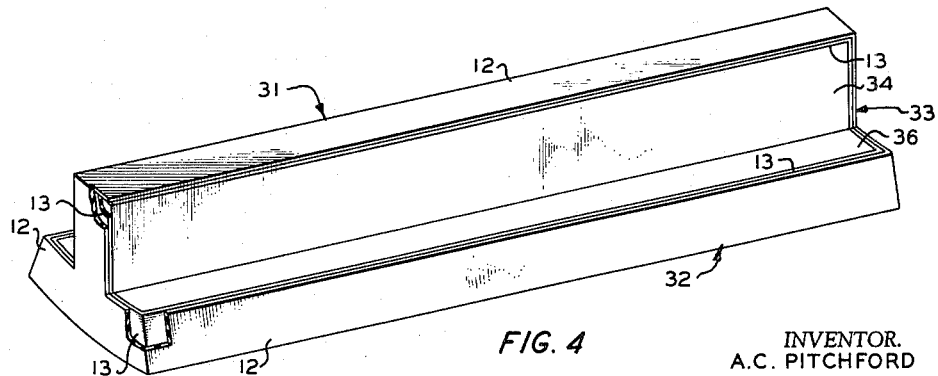
FIGURES 4 and 5 are isometric views of other types of grains of solid propellant restricted in accordance with this invention.

Referring now to FIGURE 4, a grain 31 of solid propellant is shown having the shape of a cog with a lower base portion 32 and a radial projection portion 33, a transverse section of the grain having the general shape of a T. The base portion 32 of cog grain 31 has a slight curvature as shown. Both ends of cog grain 31 as well as the top of projection portion 33 and the sides of base portion 32 are covered with burning restricting material 12 bonded to the propellant material with a thin layer of adhesive 13. Restricting the cog grain 31 in this manner leaves the sides 34 of the projection portion 33 and the top 36 of the base portion 32 exposed, these exposed surfaces 34, 36 serving as burning surfaces. As will be discussed in detail hereinafter, a plurality of cog grains 31 are longitudinally and circumferentially contiguously aligned to form a cylindrical liner of solid propellant in a rocket motor with the bottoms of the base portions 32 bonded to the inner wall of the rocket motor casing and the projection portions 33 radiating inwardly.

Figure 5:
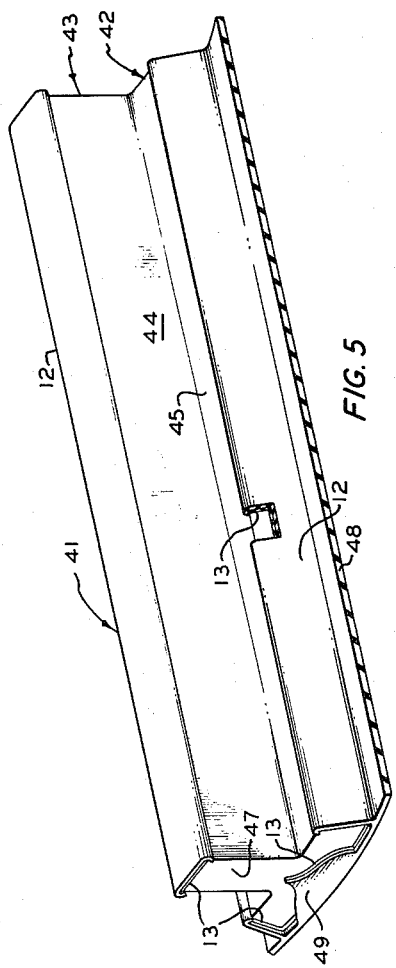

Referring now to FIGURE 5, a modified cog grain 41 is shown having a base portion 42 and a projection portion 43. Like cog grain 31 of FIGURE 4, the sides 44 of projection portion 43 and the top 45 of base portion 42 are exposed to form burning surfaces, whereas the top of projection portion 43 and the sides of base portion 42 are similarly covered with burning restricting material 12. The ends 47 of cog grain 41 are shown exposed but these ends may also be restricted with restricting material. The bottom of cog grain 41 is bonded to a liner 48 of restricting material, which in turn can be bonded to the inner wall of a rocket motor casing. The liner 48 can have a longitudinally extending rib portion 49 upon which the cog grain 41 is placed and bonded to with adhesive 13, the bottom of base portion 42 being shaped to conform to the inner rib 49. Rib 49 can be merely a thickened or integral portion of liner 48, as shown, or a separable part.

It is to be understood that other solid grains of propellant can be similarly restricted according to this invention and the latter is not to be unduly limited to those grains illustrated and described herein. For example, cylindrical grains of solid propellant with or without axial perforations can have some of their surfaces restricted according to this invention. As a further example, a large propellant charge, such as those employed for booster or sustainer surfaces, can be built up from a plurality of smaller or modular grains in the form of a cylinder with a star-shaped perforation defined by an internal burning surface. In order to avoid prolixity, these other types of grain geometries are not shown.

Figure 6:
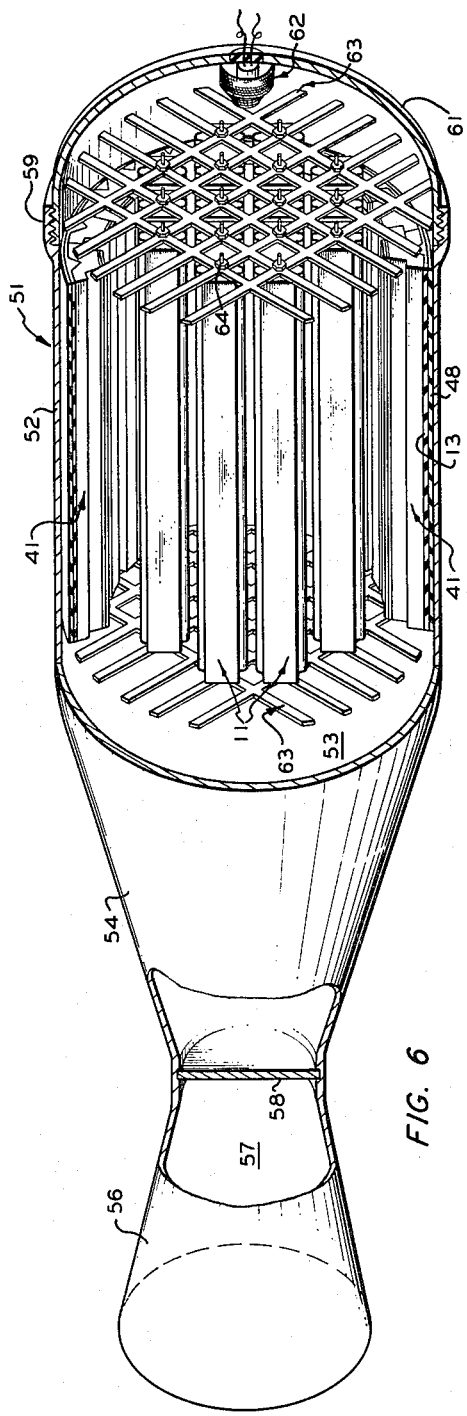
FIGURE 6 is an isometric view in partial section of a rocket motor, loaded with a plurality of grains such as those of FIGURES 1 and 5.

FIGURE 6 illustrates a rocket motor generally designated 51. Rocket motor 51 has a generally cylindrical metal casing 52 defining a combustion chamber 53. The rear or aft end of casing 52 is reduced or tapered at 54 and is connected to a reaction nozzle 56, the latter being either integral with the reduced casing portion 54, as shown, or separable and connected to casing portion 54 by any suitable means, such as bolted flanges. Casing portion 54 and nozzle 56 define a converging diverging passage 57 of the De Laval type which is designed to communicate with combustion chamber 53. Positioned anywhere along passage 57, preferably across the throat thereof, is a thin circular starter or blowout disc 58 made of metal or plastic and designed to function, for example by rupturing, when the rocket motor is fired and the pressure in the combustion chamber 53 reaches predetermined pressure generally designated as the blowout or starter disc bursting pressure. The other or head end of casing 52 is closed and preferably constructed in the form of an annular flange 59 which is secured to a suitable head closure 61 by means of threads, welding, or the like. Positioned anywhere in the combustion chamber 53, and preferably in the head end thereof, is one or more igniters, such as igniter generally designated 62 which is axially connected to head closure member 61 and projects inwardly into the combustion chamber 53. Igniter 62 is preferably in the form of a flangible wire container or cup and contains suitable ignition material, such as black powder or the like. A suitable igniter which is preferred is that disclosed in copending application, Serial No. 591,340, filed June 14, 1958, by B. R. Adelman, now Patent No. 2,980,021. The igniter 62 has suitable electrical wires which pass through the head closure number 61 and can be connected to a suitable external power source.

Loaded within the combustion chamber 53 is a propellant charge comprising a plurality of longitudinally and spacially aligned grains of solid propellant restricted in accordance with this invention, such as grains 11 of FIGURE 1. Grains 11 can be arranged in any suitable manner, but preferably are arranged in a generally symmetrical pattern. The protruding portions of the longitudinal support rods 17 of the grains 11 pass through suitable fixed grids or support plates generally designated 63 at either end of the propellant charge. Preferably, the support grids 63 are formed from a plurality of cross-bars which are provided with suitable openings at their junctures through which the protruding portions of the support rods 17 of the grains 11 pass and are secured thereto by any suitable means, such as nuts 64 which are securely fastened so as to maintain the grains 11 in a fixed position.

Although the plurality of grains 11 can constitute the sole propellant charge, it is within the scope of this invention to also provide the combustion chamber with a cylindrical liner of propellant material. For example, a plurality of the cog grains 41 of FIGURE 5 are longitudinally and circumferentially contiguously aligned in the combustion chamber 53 so as to surround the suspended grains 11. The cog grains 41 can extend the entire length of the combustion chamber 53, or a plurality of longitudinally aligned cog grains can be separated by suitable restricting material. The cog grains 41 are bonded by means of adhesive 13 to the cylindrical liner 48 of restricting material which is in turn adhesively bonded to the inner wall of the rocket motor casing 52. The projection portions of the cog grains 41 which extend radially inwardly preferably all have the same length, although it is within the scope of this invention to have some projection portions of circumferentially alternate cog grains longer than those of adjacent cog grains, thereby providing an additional feature by which the volumetric loading density of the charge can be varied.

While FIGURE 6 illustrates a single propellant charge or bundle of grains, it is within the scope of this invention to load a plurality of such charges arranged in a tandem manner, with each bundle or charge having the same or a different number of grains so as to vary a volumetric loading density from one bundle to the next.

It is evident that the grains 21 of FIGURE 3 can be similarly loaded and supported in the combustion chamber of the rocket motor 51, but for purposes of brevity have not been so illustrated. Also, alternatively, a plurality of the cog grains of FIGURE 4 can be loaded in the combustion chambers so as to form a cylindrical liner.

In operation, the rocket motor 51 of FIGURE 6 is fired by closing a suitable switch in an electrical circuit to which the electrical wires of the igniter 62 are connected. Subsequently, igniter 62 functions and the ignition products burn and are released from the igniter cup and flow into the combustion chamber 53. The hot combustion products from the igniter 62 immediately propagate throughout the combustion chamber 53 and heat is transferred to the exposed surfaces of the grains 11, such as exposed surfaces 14 and 16 of FIGURE 1, raising the temperature thereof to an ignition temperature. Where a cylindrical liner of propellant is also loaded in the combustion chamber, the exposed burning surfaces thereof will also be raised to an ignition temperature. Consequently, the propellant material of the charge begins to burn and is consumed, burning of the propellant material generating combustion gases. The burning of the propellant material is initially limited to only the exposed burning surfaces, the other surfaces being restricted to prevent such ignition of the surfaces restricted. The resulting combustion gases raise the temperature and pressure in the combustion chamber 53 and when a predetermined starter disc bursting pressure is reached, e.g., 350–300 p.s.i., the starter disc 58 functions, for example by rupturing and expulsion from the reaction nozzle 56. Pressure within the combustion chamber 53 then levels out at an operating or working pressure, e.g., 500–1000 p.s.i., and the combustion gases pass at a high velocity through the open passage 57, thereby imparting thrust to the rocket motor. The propellant material making up the charge continues to burn until such time as all the propellant material is consumed.

The rocket grains restricted according to the practice of this invention have improved burning characteristics. The burning of the propellant is limited to the initially exposed burning surfaces by reason of the manner of restricting the propellant according to this invention, the restricting material remaining positively bonded to the propellant material until complete burnout. This restriction is flame and pressure resistant and can be applied in the economical fashion. The bond between the restricting material and the propellant material is strong and the subjection of the restricted propellant charge to elevated temperatures for extended periods will not adversely affect or diminish the reliability of the bond.

The grains restricted in accordance with this invention can be fabricated from any suitable solid rocket propellant by extrusion, molding, or casting. The preferred grains of this invention are extruded from composite-type solid rocket propellant comprising a major amount of a solid inorganic oxidizing salt and a minor amount of a rubbery binder material. Solid rocket propellant compositions of the composite-type which are especially preferred, and which have proven particularly applicable in this invention, are those disclosed and claimed in co-pending application Serial No. 284,447, filed April 25, 1952, by W. B. Reynolds et al., now Patent No. 3,003,861, and those disclosed and claimed in co-pending application Serial No. 561,943, filed January 27, 1956, by W. B. Reynolds et al. The propellant compositions disclosed in these co-pending applications comprises a solid oxidant and a binder formed by polymerizing a rubbery copolymer of a vinyl heterocyclic nitrogen base compound with an open chain conjugated diene. The following empirical formulas or recipes generally represents the class of propellant compositions preferred for the preparation of the propellant grains restricted according to this invention:

Table 1

| Ingredient | Parts per 100 parts of rubber | Parts by Weight |
|---|---|---|
| Binder | | 5–50 |
| Copolymer (Bd/MVP) | 100 | |
| Philblack A (a furnace black) | 10–30 | |
| Plasticizer | 10–30 | |
| Silica | 0–20 | |
| Metal Oxide | 0–5 | |
| Antioxidant | 0–5 | |
| Wetting Agent | 0–2 | |
| Accelerator | 0–2 | |
| Sulfur | 0–2 | |
| Oxidizer (Ammonium nitrate) | | 50–95 |
| Burning rate catalyst | | 0–30 |

The polymerizable heterocyclic nitrogen bases which are applicable for the production of polymeric binder materials are those having a vinyl group, $$CH_2=\overset{|}{C}-R$$

where R is either hydrogen or a methyl group, and are copolymerizable with a conjugated diene. Substituted heterocyclic nitrogen base compounds particularly useful are those selected from the group consisting of pyridine, quinoline, alkyl substituted pyridine and an alkyl substituted quinoline, where the total number of carbon atoms in the nuclear alkyl substituents is not more than 15. Of these, the compounds of the pyridine series are of the greatest commercial interest at present. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML–4) plasticity value in the range of 10–40, preferably in the range of 15 to 25.

These heterocyclic nitrogen bases can be represented by the following structural formulas:

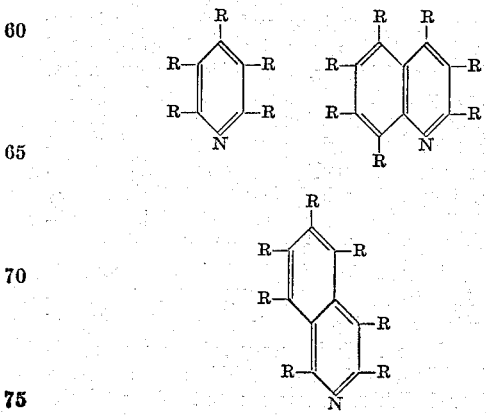

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine;
2-vinyl-5-ethylpyridine;
2-methyl-5-vinylpyridine;
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
2,4-dimethyl-5,6-dipentyl-3-vinylpyridine;
2-decyl-5-(alpha-methylvinyl)pyridine;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl)pyridine;
3-vinyl-5-phenylpyridine;
2-(para-methyl-phenyl)-3-vinyl-4-methylpyridine;
3-vinyl-5-(hydroxyphenyl)-pyridine;
2-vinylquinoline;
2-vinyl-4-ethylquinoline;
3-vinyl-6,7-di-n-propylquinoline;
2-methyl-4-nonyl-6-vinylquinoline;
4-(alpha-methylvinyl)-8-dodecylquinoline;
3-vinylisoquinoline;
1,6-dimethyl-3-vinylisoquinoline;
2-vinyl-4-benzylquinoline;
3-vinyl-5-chloroethylquinoline-3-vinyl-5,6-dichloro-isoquinoline;
2-vinyl-6-ethoxy-7-methylquinoline; 3-vinyl-6-hydroxymethylisoquinoline; and the like.

Oxidants which are applicable in the solid rocket fuel compositions of this invention include ammonium, alkali metal, and alkaline earth metal salts of nitric, perchloric, and chloric acids, and mixtures thereof. Ammonium nitrate and ammonium perchlorate are the preferred oxidants for use in the solid rocket fuels of this invention. Specific oxidants include sodium nitrate, potassium perchlorate, lithium chlorate, calcium nitrate, barium perchlorate, and strontium chlorate. Mixtures of oxidants are also applicable. In the preparation of the solid rocket fuel compositions, the oxidants are powered to sizes preferably 10 to 300 microns average particle size. The amount of solid oxidant employed is usually a major amount of the total composition and is generally in the range between 50 and 90 percent by weight of the total mixture of oxidant and binder. If desired, however, less than 50 percent by weight of the oxidant can be used.

Suitable plasticizers useful in preparing these propellant grains include TP-90-B (dibutoxyethoxyethyl formal); benzophenone; and Pentaryl A (monoamylbiphenyl). Suitable silica preparations include a 10–20 micron size range; and Hi-Sil 202, a rubber grade material. A suitable antioxidant is Flexamine, a physical mixture containing 25 percent of a complex diarylamine-ketone reaction product and 35 percent of N,N'-diphenyl-p-phenylenediamine. A suitable wetting agent is Aerosol-OT (dioctyl sodium sulfosuccinate). Satisfactory rubber cure accelerators include Philcure 113 (SA-113 N,N-dimethyl-S-tertiary butylsulfenyl dithiocarbamate); Butyl-8 (a dithiocarbamate-type rubber accelerator); and GMF (quinone dioxime).

Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

The various ingredients in the rocket fuel composition can be mixed on a roll mill or an internal mixer such as a Banbury or a Baker-Perkins dispersion blade mixer can be employed. The binder forms the continuous phase in the finished fuel composition wth the oxidant as the discontinuous phase. Rocket grains are formed by compression molding, injection molding or extrusion. The curing temperature will generally be in the range between 70 and 250° F., preferably between 170 and 200° F.

Specific propellant formulations or recipes proven useful in preparing the grains restricted according to this invention are those set forth in Table II.

Table II

| Propellant | Parts by Weight | |
| --- | --- | --- |
|  | A | B |
| Bd/MVP (90:10) | 10.31 | 10.31 |
| Philblack A | 2.32 | 2.32 |
| Flexamine | 0.31 | 0.31 |
| Zn Oxide | 0.50 | 0.50 |
| MgO | 2.06 | 2.06 |
| ZP-211 [a] | 2.06 | 2.06 |
| NH₄NO₃ | 85.00 | 85.00 |
| Milori Blue | 2.00 | 2.00 |
| Hi-Sil 233 [b] |  | 0.50 |
| Butarez [c] | 1.00 |  |

[a] Same as TB-90-B with low boiling materials removed.
[b] A rubber grade material.
[c] Liquid polybutadiene.

The restricting materials particularly applicable in the practice of this invention are copolymers of vinyl heterocyclic nitrogen bases and open chain conjugated dienes, these copolymers being the same as those employed as binder materials in the preparation of the solid propellant compositions described hereinbefore and disclosed in said co-pending applications, Serial Nos. 284,447, now Patent No. 3,003,861, and 561,943 by W. B. Reynolds et al. The preferred restricting material used in restricting the propellant grains according to this invention is a 90/10 1,3-butadiene/2-methyl-5-vinyl pyridine copolymer.

Where according to one embodiment of this invention the presence of the chromium compound at the interface between the propellant surface and restricting material is insured by incorporating the chromium compound in the restricting material, the amount of the chromium compound so incorporated will generally vary between one and 25 weight percent, based on the restricting material.

Specific restrictor compositions or recipes useful in the practice of this invention are those set forth in Table III.

Table III

| Ingredient | A | B | C | D |
|---|---|---|---|---|
| GR-S-1505 [a] | 62.70 | 69.09 | | |
| Bd/MVP (90:10) | | | 69.44 | 46.41 |
| Neoprene WRT [b] | | | 18.91 | 12.64 |
| Dioctyl Adipate | 6.27 | | | |
| Philblack | 21.94 | 24.18 | 7.11 | |
| Flexamine | 0.94 | 1.04 | 3.78 | 2.53 |
| Wood Rosin | 1.88 | 3.45 | | |
| Zinc Oxide | 1.88 | 0.69 | | |
| Sulfur | 1.57 | 0.17 | | |
| Stearic Acid | 0.94 | 0.69 | | |
| Butyl Eight | 1.88 | 0.69 | | |
| Ferro 1203 [c] | | | 0.76 | 0.51 |
| Asbestos Powders | | | | 37.91 |

[a] Government reserve butadiene-styrene rubber.
[b] A chloroprene polymer.
[c] Barium or calcium liquid soap stabilizer.

The restrictor can be applied under pressure to the surface of the propellant desired to be restricted. Alternately, the restrictor can be "stitched" to the propellant surface with a suitable tool having rowels which prick the restrictor and tack it to the propellant surface. The restricted grain is then cured at elevated temperatures, for example, 190° F. for 24–48 hours, during which time the propellant material and adhesive are concomitantly cured. Alternatively, a cured grain is restricted as described above, and then the bond is cured at elevated temperatures. Alternatively, cured restricting material can be applied to uncured propellant material.

Adhesives which can be used to adhesively bond the restrictor materials of this invention to the desired surfaces of the solid rocket propellant grains include any adhesives which will effect a reliable bond and which is capable of withstanding the extreme operational pressures and temperatures encountered either during storage of the fabricated grains or during operation of the rocket motor. Particularly useful adhesives which can be employed in the practice of this invention are those set forth in Table IV.

Table IV

| Ingredients | A | B | C [a] | D [b] | E |
|---|---|---|---|---|---|
| Methyl ethyl ketone | | 85.00 | | | |
| Paracril D [c] | | 7.39 | | | |
| Flexamine | | 0.22 | | | |
| Schnectady resin (SP-6601) [d] | | 7.39 | | | |
| Shell Epon 828 [e] ⎫ Part A | | | 48.78 | | |
| IP-3 Thiokol polysulfide ⎭ | | | 32.52 | | |
| Versamid [f] ⎫ Part B | | | 16.26 | | |
| Triethylene tetramine ⎭ | | | 2.44 | | |
| Castor oil | | | | 57.14 | |
| Neopentyl glycol ⎫ Part A | | | | 10.86 | |
| Tolylene diisocyanate ⎭ | | | | 16.00 | |
| Tolylene diisocyanate Part B | | | | 16.00 | |
| Shell Epon 815 [e] | | | | | 99.01 |
| DMP 30 [g] | | | | | 0.99 |
| Toluene | 50.00 | | | | |
| EC-1300 [h] | 50.00 | | | | |

[a] Parts A and B are mixed separately, and immediately prior to use the 2 parts are mixed in a 1:1 ratio.
[b] After part A is mixed and allowed to stand 4 hours, part B is added.
[c] A butadiene/acrylonitrile rubber.
[d] A phenolic resin.
[e] Epoxy resin.
[f] Polyamide resin.
[g] Substituted aminomethyl phenol.
[h] Rubber base adhesive.

Where according to one embodiment of this invention, the presence of the water-soluble chromium compound at the juncture between the propellant material and restricting material is insured by incorporating the chromium compound into the adhesive or restrictor composition, the amount of chromium compound thus incorporated will generally be in the range of from 1.5 to 25 weight percent, based on the adhesive or restrictor formulation.

As mentioned hereinbefore, it is also within the scope of this invention to insure the presence of the chromium compound at the juncture between the restricting material and the propellant surface by wiping, coating, painting or otherwise applying to said surface a solution of the chromium compound. For example, the propellant material can be wiped with a very thin layer, e.g., $\frac{1}{1000}$ inch, of an aqueous ammonium dichromate solution having a concentration of 1.5 to 25 weight percent. Alternatively, this solution can be prepared by dissolving an alkali metal or ammonium dichromate compound in 95% sulfuric acid so as to provide a chromic acid solution, which may be diluted with water to provide a concentration equivalent to 1.5 to 25 weight per cent alkali metal dichromate. Aqueous solutions of the chromium compound are preferred because of the higher solubility of the chromium compound in the water; however, in the lower concentration range, solution of the chromium compound in water with the subsequent addition of a ketone, such as methyl ethyl ketone, in amount insufficient to cause the cloud point of the ketone-chromium mixture, can be substituted if desired. Water is the preferred solvent because it leaches the exposed oxidizer from the surface of the propellant, thereby increasing the area in which a bond may be effected.

Representative water-soluble chromium compounds useful in practicing this invention include chromic acetate, chromic nitrate, chromic sulfate, chromous chloride, ammonium dichromate, potassium dichromate, sodium chromate, sodium dichromate, and the like; ammonium dichromate is the preferred compound.

The applicability and advantages of this invention were demonstrated by carrying out the following procedure. Two grains of solid propellant were restricted according to the invention. In one run, designated A, the propellant material employed in fabricating the grain was that designated A in Table II and another run, designated B, the propellant employed was that designated B in Table II. The surfaces of the grains of propellant desired to be restricted were treated by wiping them with a 15 percent aqueous solution of ammonium dichromate. After this solution dried, the adhesive designated B in Table IV was applied to the treated surface, and then restricting material having the composition designated C in Table III applied, and the restricted grain cured and hot aged in 190° F. for 4 weeks. Upon examination of the restricted grains following this period, excellent results were obtained, the bonds being effective, and the objects of this invention achieved.

Various modifications and alterations of this invention will become apparent to those skilled in the art without departing from the scope and spirit of this invention, and it is to be understood that the latter should not be unduly limited to the foregoing discussion and drawings which illustratively set forth preferred embodiments of this invention.

I claim:

1. In a method of restricting a grain of solid rocket propellant comprising 50 to 90 parts by weight of a solid inorganic oxidizing salt selected from the group consisting of the ammonium, alkali metal, and alkaline earth metal salts of nitric, perchloric, and chloric acids and 5 to 50 parts by weight of a binder comprising a rubbery copolymer of a vinyl substituted heterocyclic nitrogen base and a conjugated diene, wherein certain surfaces of said grain are restricted by adhesively bonding rubbery restricting material comprising said copolymer to said surfaces, the improvement comprising applying to said surfaces a thin layer of an aqueous solution of 1.5 to 25 weight percent of a water soluble chromium compound, and then bonding said restricting material to the thus treated surfaces, said chromium compound being selected from the group consisting of chromic acid, chromic nitrate, chromic sulfate, chromous chloride, ammonium dichromate, potassium dichromate, sodium chromate, and sodium dichromate.

2. In a method of restricting a grain of solid rocket propellant comprising 60 to 90 parts by weight of a solid inorganic oxidizing salt and 5 to 50 parts by weight of a binder comprising a rubbery copolymer of a vinyl-substituted heterocyclic nitrogen base and a conjugated diene, wherein certain surfaces of said grain are adhesively bonded to rubbery restricting material comprising said copolymer, the improvement comprising applying to said surfaces a thin layer of an aqueous solution of a water soluble chromium compound, and then bonding said restricting material to the thus treated surfaces, said chromium compound being selected from the group consisting of chromic acid, chromic nitrate, chromic sulfate, chromous chloride, ammonium dichromate, potassium dichromate, sodium chromate, and sodium dichromate.

3. The method according to claim 2 wherein said presence of said chromium compound is insured by wiping said propellant surface with a thin layer of an aqueous solution of 1.5 to 25 weight percent of said chromium compound, and then adhesively bonding said restricting material to the wiped surface.

4. The method according to claim 2 wherein said chromium compound is ammonium dichromate.

5. The method according to claim 2 wherein said copolymer is a copolymer of 1,3-butadiene and 2-methyl-5-vinylpyridine, said oxidizing salt is ammonium nitrate, and said chromium compound is ammonium dichromate.

6. The method according to claim 2 wherein said vinyl substituted heterocyclic nitrogen base is selected from those having the following structural formulas:

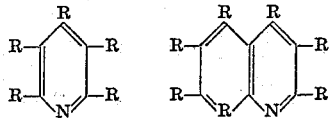

or

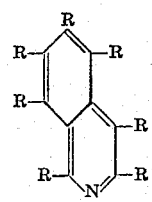

where R is selected from the group consisting of hydrogen, alkyl, vinyl, alpha-methylvinyl, alkoxy, halo, hydroxy, cyano, aryloxy, aryl, and combinations thereof, one of said R groups in each said structural formulas being selected from the group consisting of vinyl and alpha-methylvinyl, and wherein the total number of carbon atoms in the nuclear substituted groups is not greater than 15.

References Cited in the file of this patent

UNITED STATES PATENTS

| | | |
|---|---|---|
| 2,479,470 | Carr | Aug. 16, 1949 |
| 2,643,184 | Cairns | June 23, 1953 |
| 2,877,504 | Fox | Mar. 17, 1959 |
| 2,931,437 | Smith | Apr. 2, 1960 |

OTHER REFERENCES

Dougherty, Chemical Engineering Progress, vol. 53, No. 10, October 10, 1957, pp. 489-92.